US010594619B2

(12) United States Patent
Kasso et al.

(10) Patent No.: US 10,594,619 B2
(45) Date of Patent: Mar. 17, 2020

(54) SYSTEM AND METHOD FOR SUPPORTING CONFIGURATION OF DYNAMIC CLUSTERS IN A MULTITENANT APPLICATION SERVER ENVIRONMENT

(71) Applicant: Oracle International Corporation, Redwood Shores, CA (US)

(72) Inventors: Christopher Kasso, Los Altos, CA (US); Byron Nevins, Pacifica, CA (US); Peter Bower, Hollis, NH (US); Rehana Tabassum, Fremont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 97 days.

(21) Appl. No.: 14/747,826

(22) Filed: Jun. 23, 2015

(65) Prior Publication Data

US 2015/0372936 A1 Dec. 24, 2015

Related U.S. Application Data

(60) Provisional application No. 62/016,040, filed on Jun. 23, 2014, provisional application No. 62/054,911, filed on Sep. 24, 2014.

(51) Int. Cl.
*H04L 12/911* (2013.01)
*H04L 12/24* (2006.01)
(Continued)

(52) U.S. Cl.
CPC .......... *H04L 47/70* (2013.01); *H04L 41/5051* (2013.01); *H04L 67/1008* (2013.01);
(Continued)

(58) Field of Classification Search
CPC ......... H04L 63/08; H04L 67/10; H04L 47/70; H04L 47/828; H04L 67/1002;
(Continued)

(56) References Cited

U.S. PATENT DOCUMENTS 7,590,724 B1 * 9/2009 Williams ............... G06Q 30/02
709/203
8,326,876 B1 12/2012 Venkataraman et al.
(Continued)

FOREIGN PATENT DOCUMENTS

CN 101405729 4/2009
CN 101639835 2/2010
(Continued)

OTHER PUBLICATIONS

European Patent Office, International Searching Authority, International Search Report and Written Opinion dated Sep. 24, 2015 for International Application No. PCT/US2015/037265, 10 pages.
(Continued)

*Primary Examiner* — Tom Y Chang
(74) *Attorney, Agent, or Firm* — Tucker Ellis LLP

(57) ABSTRACT

A system and method for supporting configuration of dynamic clusters in an application server environment. The method can begin with providing, at one or more computers, including an application server environment executing thereon, a plurality of deployable resources which can be used within the application server environment, and one or more partitions, wherein each partition provides an administrative and runtime subdivision of the domain, wherein the system can associate one or more partitions with a tenant, for use by the tenant. The method can further provide a dynamic cluster for use by the one or more partitions, the dynamic cluster comprising an initial number of servers running within the dynamic cluster. The method can then receive, at
(Continued)

an administration server to receive, a command; and then configure, via an API, the dynamic cluster.

20 Claims, 8 Drawing Sheets

(51) Int. Cl.
*H04L 29/08* (2006.01)
*G06F 9/50* (2006.01)
*G06F 9/455* (2018.01)
*G06F 8/60* (2018.01)

(52) U.S. Cl.
CPC ............ *H04L 67/1031* (2013.01); *G06F 8/60* (2013.01); *G06F 9/505* (2013.01); *G06F 9/5061* (2013.01); *G06F 9/5072* (2013.01); *G06F 9/5077* (2013.01); *G06F 2009/4557* (2013.01); *G06F 2009/45562* (2013.01); *H04L 41/0813* (2013.01); *H04L 41/0893* (2013.01); *H04L 47/828* (2013.01); *H04L 67/1002* (2013.01); *H04L 67/1012* (2013.01)

(58) Field of Classification Search
CPC ............. H04L 67/1031; H04L 67/1008; H04L 67/1012; H04L 67/1023; H04L 41/0813; H04L 41/5051; H04L 41/0893; G06F 9/45558; G06F 9/5077; G06F 9/505; G06F 9/95558; G06F 9/5072
See application file for complete search history.

(56) References Cited

U.S. PATENT DOCUMENTS

| | | | | |
|---|---|---|---|---|
| 2002/0059427 A1* | 5/2002 | Tamaki | ................. | G06F 9/5027 709/226 |
| 2006/0015839 A1* | 1/2006 | Owens | ..................... | G06F 8/20 717/100 |
| 2006/0168169 A1* | 7/2006 | Finan | ....................... | G06F 9/54 709/223 |
| 2009/0132692 A1* | 5/2009 | Ansari | .................. | G06F 21/121 709/223 |
| 2009/0271696 A1 | 10/2009 | Bailor et al. | | |
| 2009/0276771 A1* | 11/2009 | Nickolov | .............. | G06F 9/4856 717/177 |
| 2011/0213870 A1 | 9/2011 | Cai et al. | | |
| 2011/0225298 A1* | 9/2011 | Brown | ..................... | G06F 9/505 709/226 |
| 2012/0072597 A1 | 3/2012 | Teather et al. | | |
| 2012/0110566 A1 | 5/2012 | Park | | |
| 2013/0036400 A1 | 2/2013 | Bak et al. | | |
| 2013/0145367 A1* | 6/2013 | Moss | ....................... | H04L 43/04 718/1 |
| 2013/0268920 A1 | 10/2013 | Ursal et al. | | |
| 2014/0149361 A1 | 5/2014 | Hosey | | |
| 2014/0297868 A1* | 10/2014 | Ennaji | ................... | H04L 47/828 709/226 |
| 2015/0193251 A1* | 7/2015 | Chu | ........................ | G06F 9/485 718/1 |
| 2015/0365275 A1* | 12/2015 | Iliev | .................... | H04L 41/5051 709/220 |
| 2015/0378700 A1* | 12/2015 | Rachamadugu | .......... | G06F 8/60 717/120 |

FOREIGN PATENT DOCUMENTS

| | | |
|---|---|---|
| CN | 102016834 | 4/2011 |
| CN | 102170457 | 8/2011 |
| CN | 102333115 | 1/2012 |
| CN | 102571821 | 7/2012 |
| CN | 102571916 | 7/2012 |
| CN | 102609271 | 7/2012 |
| CN | 102834822 | 12/2012 |
| CN | 102932404 | 2/2013 |
| CN | 102932405 | 2/2013 |
| CN | 103455512 | 12/2013 |

OTHER PUBLICATIONS

European Patent Office, International Searching Authority, International Search Report and Written Opinion dated Apr. 24, 2015 for International Application No. PCT/US2015/012268, 10 pages.
United States Patent and Trademark Office, Office Action dated Dec. 15, 2017 for U.S. Appl. No. 14/747,675, 15 Pages.
Chinese Patent Office, Office Action dated Jul. 20, 2018, 8 pages.
Chinese Office Action for Chinese Application No. 201580032354.7, dated Jan. 18, 2019, 8 pages.

\* cited by examiner

SYSTEM AND METHOD FOR SUPPORTING CONFIGURATION OF DYNAMIC CLUSTERS IN A MULTITENANT APPLICATION SERVER ENVIRONMENT

CLAIM OF PRIORITY AND CROSS-REFERENCE TO RELATED APPLICATIONS

This application claims the benefit of priority to U.S. Provisional Application titled "SYSTEM AND METHOD FOR SUPPORTING MULTIPLE PARTITION EDIT SESSIONS IN A MULTITENANT APPLICATION SERVER ENVIRONMENT", Application No. 62/016,040, filed Jun. 23, 2014; U.S. Provisional Application titled "SYSTEM AND METHOD FOR SUPPORTING CONFIGURATION OF DYNAMIC CLUSTERS IN A MULTITENANT APPLICATION SERVER ENVIRONMENT", Application No. 62/054,911, filed Sep. 24, 2014; and is related to U.S. patent application titled "SYSTEM AND METHOD FOR SUPPORTING MULTITENANCY IN AN APPLICATION SERVER, CLOUD, OR OTHER ENVIRONMENT", application Ser. No. 14/601,883, filed Jan. 21, 2015; each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and cloud environments, and are particularly related to a system and method for supporting configuration of dynamic clusters in a multitenant application server environment.

BACKGROUND

Software application servers, examples of which include Oracle WebLogic Server (WLS) and Glassfish, generally provide a managed environment for running enterprise software applications. Recently, technologies have also been developed for use in cloud environments, which allow users or tenants to develop and run their applications within the cloud environment, and to take advantage of distributed resources provided by the environment.

SUMMARY

In accordance with an embodiment, described herein is a system and method for supporting configuration of dynamic clusters in an application server environment. The method can begin with providing, at one or more computers, including an application server environment executing thereon, a plurality of deployable resources which can be used within the application server environment, and one or more partitions, wherein each partition provides an administrative and runtime subdivision of the domain, wherein the system can associate one or more partitions with a tenant, for use by the tenant. The method can further provide a dynamic cluster for use by the one or more partitions, the dynamic cluster comprising an initial number of servers running within the dynamic cluster. The method can then receive, at an administration server to receive, a command; and then configure, via an API, the dynamic cluster.

DETAILED DESCRIPTION

In accordance with an embodiment, a system and method for supporting configuration of dynamic clusters in an application server environment is disclosed herein. The method can begin with providing, at one or more computers, including an application server environment executing thereon, a plurality of deployable resources which can be used within the application server environment, and one or more partitions, wherein each partition provides an administrative and runtime subdivision of the domain, wherein the system can associate one or more partitions with a tenant, for use by the tenant. The method can further provide a dynamic cluster for use by the one or more partitions, the dynamic cluster comprising an initial number of servers running within the dynamic cluster. The method can then receive, at an administration server to receive, a command; and then configure, via an API, the dynamic cluster.

Application Server (e.g., Multi-Tenant, MT) Environment

Figure 1:
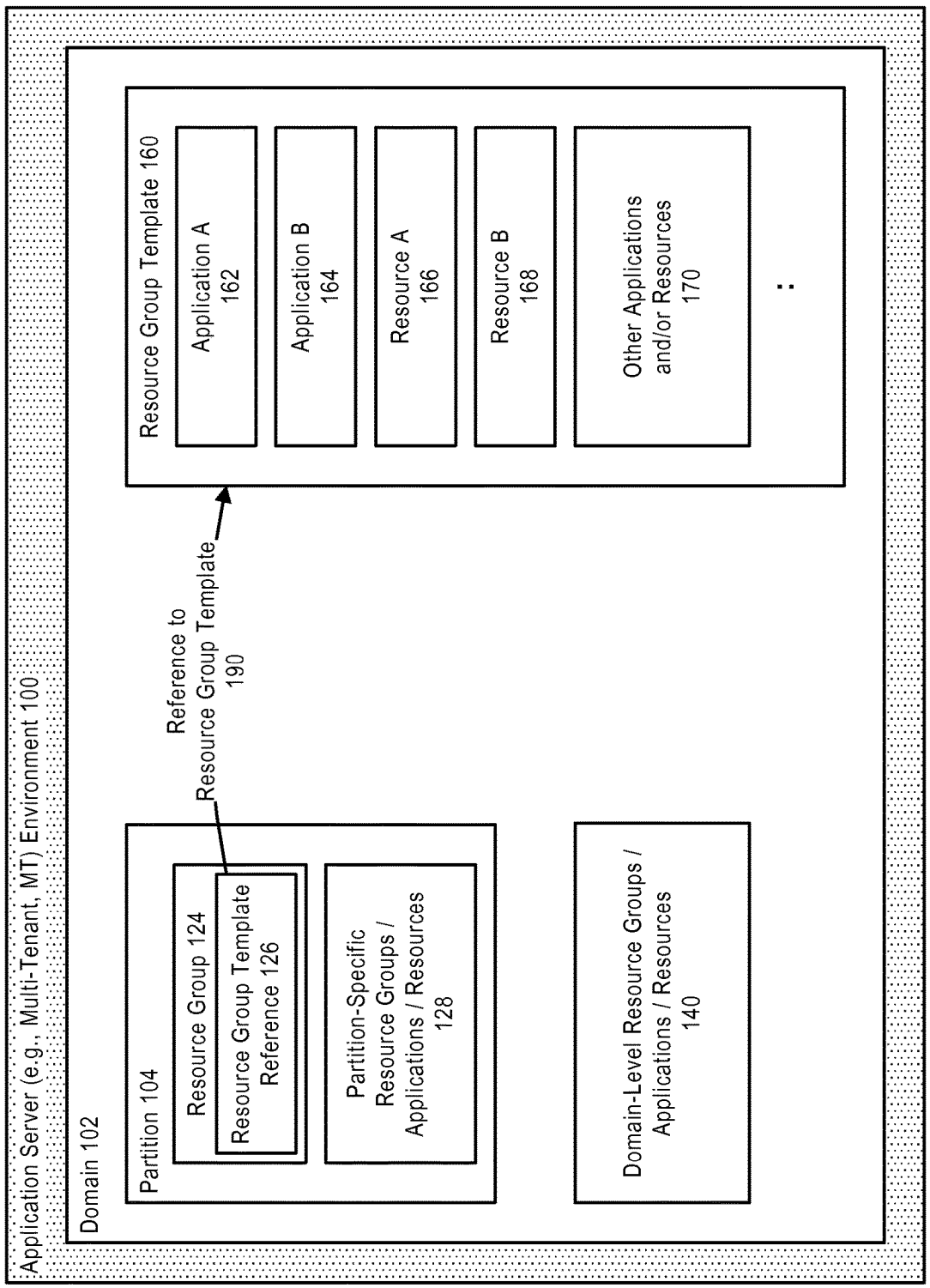
FIG. 1 illustrates a system for supporting multi-tenancy in an application server, cloud, or other environment, in accordance with an embodiment.

FIG. 1 illustrates a system for supporting multi-tenancy in an application server, cloud, or other environment, in accordance with an embodiment.

As illustrated in FIG. 1, in accordance with an embodiment, an application server (e.g., multi-tenant, MT) environment 100, or other computing environment which enables the deployment and execution of software applications, can be configured to include and operate according to a domain 102 configuration that is used at runtime to define an application server domain.

In accordance with an embodiment, the application server can include one or more partitions 104 that are defined for use at runtime. Each partition can be associated with a globally unique partition identifier (ID) and partition configuration, and can further include one or more resource groups 124, together with a reference to a resource group template 126 and/or partition-specific applications or resources 128. Domain-level resource groups, applications and/or resources 140 can also be defined at the domain level, optionally with a reference to a resource group template.

Each resource group template 160 can define one or more applications A 162, B 164, resources A 166, B 168, and/or other deployable applications or resources 170, and can be referenced by a resource group. For example, as illustrated in FIG. 1, resource group 124 in partition 104 can reference 190 resource group template 160.

Generally, a system administrator can define partitions, domain-level resource groups and resource group templates, and security realms; while a partition administrator can define aspects of their own partition, for example, by creating partition-level resource groups, deploying applications to the partition, or referencing specific realms for the partition.

Figure 2:
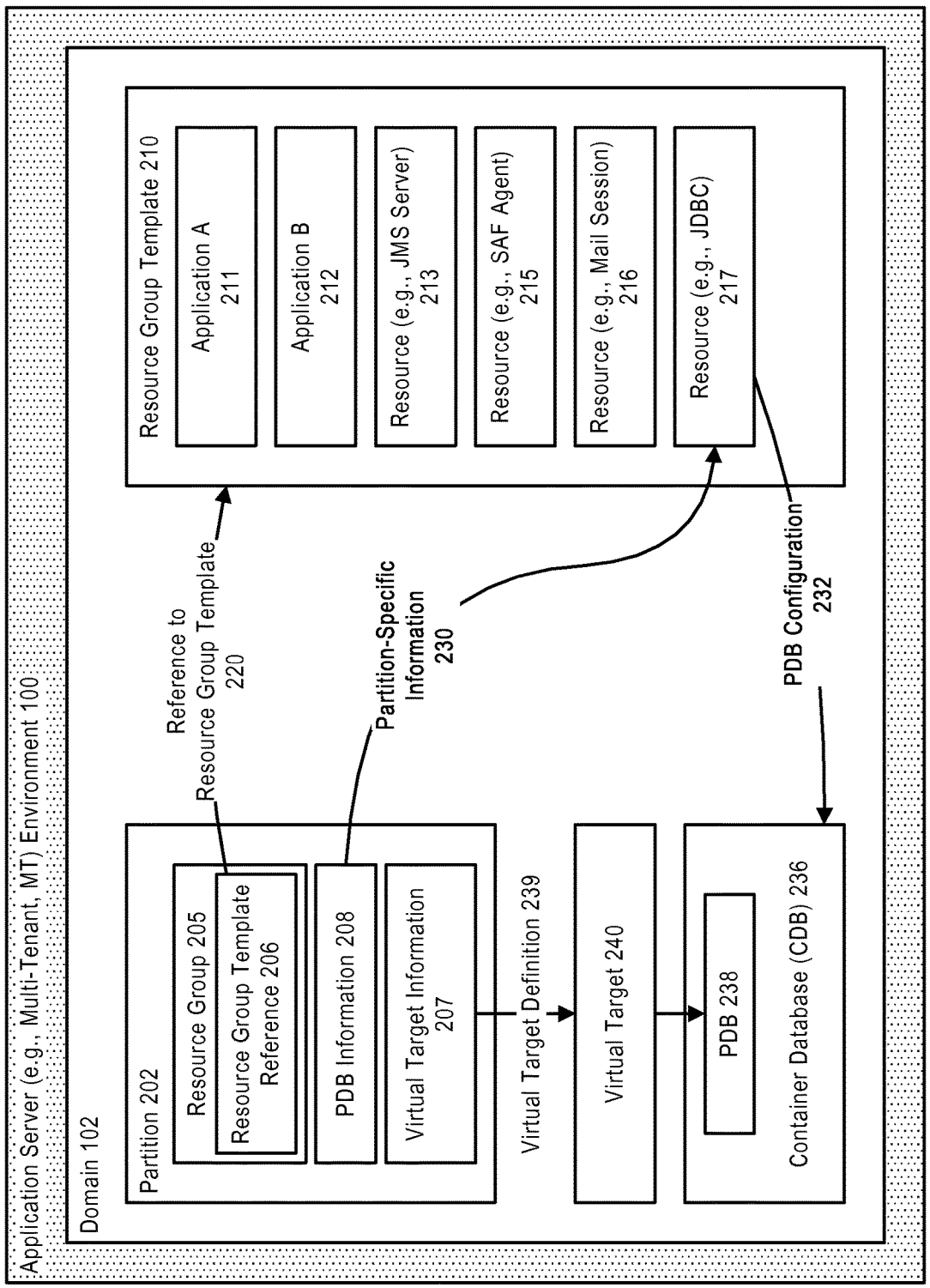
FIG. 2 further illustrates a system for supporting multi-tenancy in an application server, cloud, or other environment, in accordance with an embodiment.

FIG. 2 further illustrates a system for supporting multi-tenancy in an application server, cloud, or other environment, in accordance with an embodiment.

As illustrated in FIG. 2, in accordance with an embodiment, a partition 202 can include, for example, a resource group 205 which includes a reference 206 to a resource group template 210, a virtual target (e.g., virtual host) information 207, and a pluggable database (PDB) information 208. A resource group template (e.g., 210) can define, for example, a plurality of applications A 211 and B 212, together with resources such as a Java Message Server (JMS) server 213, store-and-forward (SAF) agent 215, mail session component 216, or Java Database Connectivity (JDBC) resource 217.

The resource group template illustrated in FIG. 2 is provided by way of example; in accordance with other embodiments, different types of resource group templates and elements can be provided.

In accordance with an embodiment, when a resource group within a partition (e.g., 202) references 220 a particular resource group template (e.g., 210), information associated with a particular partition can be used in combination with the referenced resource group template, to indicate a partition-specific information 230, for example a partition-specific PDB information. The partition-specific information can then be used by the application server to configure resources, for example a PDB resource, for use by the partition. For example, partition-specific PDB information associated with partition 202 can be used, by the application server, to configure 232 a container database (CDB) 236 with an appropriate PDB 238, for use by that partition.

Similarly, in accordance with an embodiment, a virtual target information associated with a particular partition can be used to define 239 a partition-specific virtual target 240, for use by the partition, e.g., baylandurgentcare.com, which can then be made accessible via a uniform resource locator (URL), e.g., http://baylandurgentcare.com.

Figure 3:
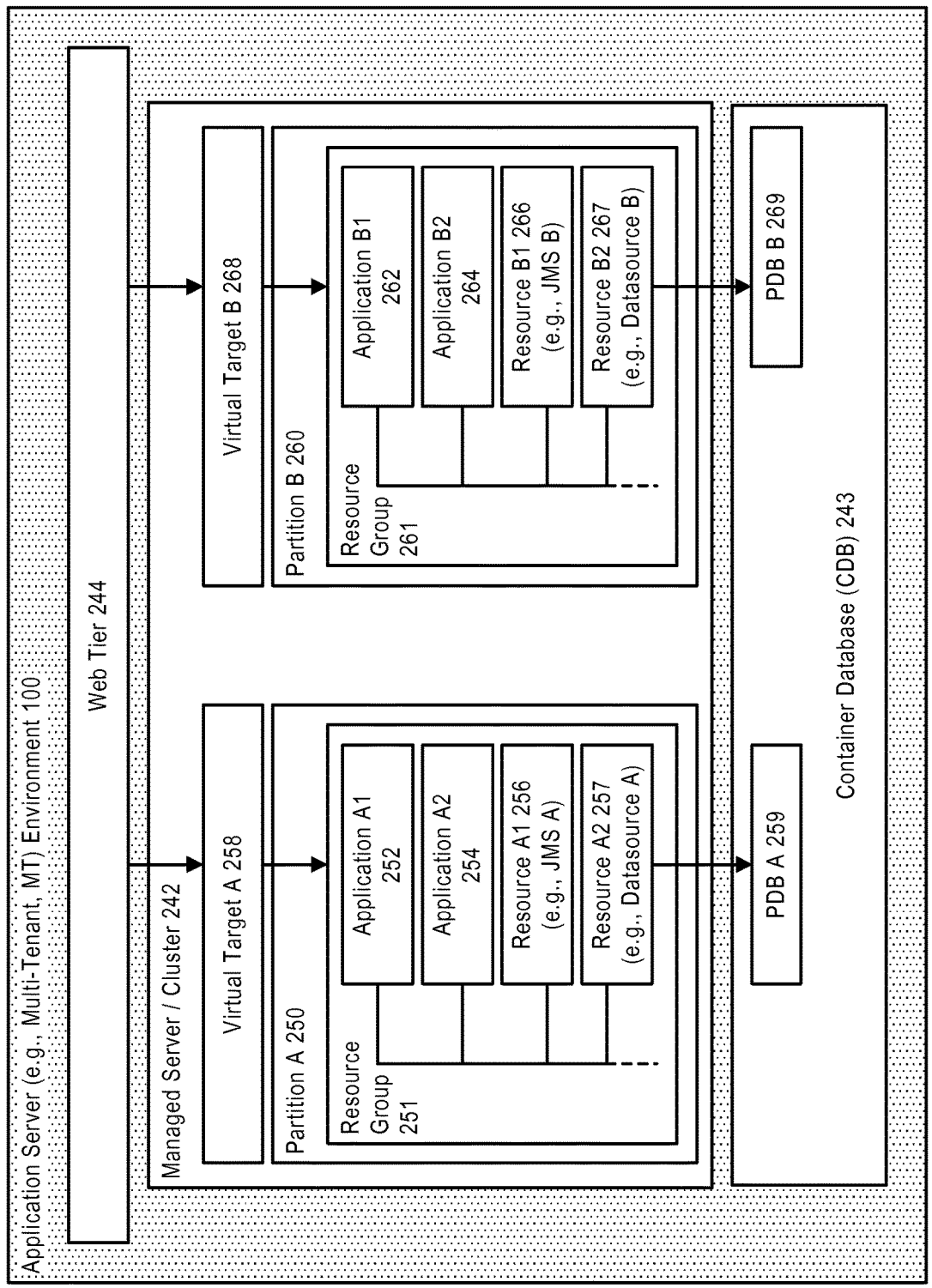
FIG. 3 further illustrates a system for supporting multi-tenancy in an application server, cloud, or other environment, in accordance with an embodiment.

FIG. 3 further illustrates a system for supporting multi-tenancy in an application server, cloud, or other environment, in accordance with an embodiment.

In accordance with an embodiment, a system configuration such as a config.xml configuration file, is used to define a partition, including configuration elements for resource groups associated with that partition, and/or other partition properties. Values can be specified per-partition using property name/value pairs.

In accordance with an embodiment, a plurality of partitions can be executed within a managed server/cluster 242, or a similar environment which can provide access to a CDB 243, and which are accessible via a web tier 244. This allows, for example, a domain or partition to be associated with one or more of the PDBs (of the CDB).

In accordance with an embodiment, each of the plurality of partitions, in this example partition A 250 and partition B 260, can be configured to include a plurality of resources associated with that partition. For example, partition A can be configured to include a resource group 251 which contains an application A1 252, application A2 254, and JMS A 256, together with a datasource A 257 associated with PDB A 259, wherein the partition is accessible via a virtual target A 258. Similarly, partition B 260 can be configured to include a resource group 261 which contains an application B1 262, application B2 264, and JMS B 266, together with a datasource B 267 associated with PDB B 269, wherein the partition is accessible via a virtual target B 268.

While several of the above examples illustrate use of CDB and PDBs, in accordance with other embodiments, other types of multi-tenant or non-multi-tenant databases can be supported, wherein a particular configuration can be provided for each partition, for example through the use of schemas, or the use of different databases.

Resources

In accordance with an embodiment, a resource is a system resource, application, or other resource or object that can be deployed to a domain of the environment. For example, in accordance with an embodiment, a resource can be an application, JMS, JDBC, JavaMail, WLDF, data source, or other system resource or other type of object that can be deployed to a server, cluster, or other application server target.

Partitions

In accordance with an embodiment, a partition is a runtime and administrative subdivision or slice of a domain that can be associated with a partition identifier (ID) and configuration, and can contain applications and/or refer to domain-wide resources through the use of resource groups and resource group templates.

Generally, a partition can contain its own applications, refer to domain wide applications via resource group templates, and have its own configuration. Partitionable entities can include resources, for example JMS, JDBC, JavaMail, WLDF resources, and other components, such as JNDI namespace, network traffic, work managers, and security policies and realms. In the context of a multi-tenant environment, the system can be configured to provide tenant access to the administrative and runtime aspects of partitions associated with a tenant.

In accordance with an embodiment, each resource group within a partition can optionally reference a resource group template. A partition can have multiple resource groups, and each of them can reference a resource group template. Each partition can define properties for configuration data that is not specified in the resource group templates to which the partition's resource groups refer. This enables the partition to act as a binding of deployable resources defined in a resource group template, to specific values for use with that partition. In some cases, a partition can override configuration information specified by a resource group template.

In accordance with an embodiment, a partition configuration, as defined for example by a config.xml configuration file, can include a plurality of configuration elements, for example: "partition", which contains the attributes and child elements that define the partition; "resource-group", which contains the applications and resources deployed to the partition; "resource-group-template", which contains applications and resources defined by that template; "jdbc-system-resource-override", which contains a database-specific service name, user name, and password; and "partition-properties", which contains property key values that can be used for macro replacement in resource group templates.

Upon startup, the system can use the information provided by the configuration file to generate partition-specific configuration elements for each resource, from the resource group template.

Resource Groups

In accordance with an embodiment, a resource group is a named, fully-qualified collection of deployable resources that can be defined either at a domain or partition level, and can reference a resource group template. The resources in a resource group are considered fully-qualified in that the administrator has provided all of the information needed to start or connect to those resources, for example the credentials for connecting to a data source, or the targeting information for a application.

A system administrator can declare resource groups at the domain level, or at the partition level. At the domain level, a resource group provides a convenient way to group related resources. The system can manage resources declared in a domain-level resource group the same as ungrouped resources, so that the resources can be started during system start-up, and stopped during system shut-down. An administrator can also stop, start, or remove a resource in a group individually, and can act on all the resources in a group implicitly by operating on the group. For example, stopping a resource group stops all of the resources in the group that are not already stopped; starting the resource group starts any resources in the group that are not already started; and removing the resource group removes all of the resources contained in the group.

At the partition level, a system or partition administrator can configure zero or more resource groups in a partition, subject to any security restrictions. For example, in a SaaS use case, various partition-level resource groups can refer to domain-level resource group templates; while in a PaaS use case, partition-level resource groups can be created that do not refer to resource group templates, but instead represent applications and their related resources that are to be made available within that partition only.

In accordance with an embodiment, resource grouping can be used to group together applications and the resources they use as a distinct administrative unit within the domain. For example, in the medical records (MedRec) application described below, a resource grouping defines the MedRec application and its resources. Multiple partitions can run the same MedRec resource group, each using a partition-specific configuration information, such that the applications that are part of each MedRec instance are made specific to each partition.

Resource Group Templates

In accordance with an embodiment, a resource group template is a collection of deployable resources that are defined at a domain level, that can be referenced from a resource group, and some of the information required to activate its resources may not be stored as part of the template itself, such that it supports the specification of partition level configuration. A domain can contain any number of resource group templates, each of which can include, for example, one or more related Java applications and the resources on which those applications depend. Some of the information about such resources may be the same across all partitions, while other information may vary from one partition to the next. Not all configuration need be specified at the domain level—partition level configuration can instead be specified in the resource group template through the use of macros, or property name/value pairs.

In accordance with an embodiment, a particular resource group template can be referenced by one or more resource groups. Generally, within any given partition, a resource group template can be referenced by one resource group at a time, i.e., not simultaneously by multiple resource groups within the same partition; however, it can be referenced at the same time by another resource group in a different partition. The object containing the resource group, e.g., the domain or partition, can use property name/value assignments to set the value of any tokens in the resource group template. When the system activates a resource group template using a referencing resource group, it can replace those tokens with values set in the resource group's containing object. In some cases, the system can also use statically-configured resource group templates and partitions to generate runtime configuration for each partition/template combination.

For example, in a SaaS use case, the system can activate the same applications and resources multiple times, including once for each partition that will use them. When an administrator defines a resource group template they can use tokens to represent the information that will be supplied elsewhere. For example, the username to use in connecting to a CRM-related data resource can be indicated in the resource group template as \${CRMDataUsername}.

Tenants

In accordance with an embodiment, in a multi-tenant environment, such as a multi-tenant (MT) application server environment, a tenant is an entity that can be represented by, or otherwise associated with, one or more partitions and/or one or more tenant-aware applications.

For example, tenants can represent distinct user organizations, such as different external companies, or different departments within a particular enterprise (e.g., HR and Finance departments), each of which can be associated with a different partition. A tenant globally unique identity (tenant ID) is the association of a particular user, at a particular moment in time, with a particular tenant. The system can derive which tenant a particular user belongs to from the user identity, for example by referring to a user identity store. The user identity enables the system to enforce those actions that a user is authorized to perform, including, but not limited to, which tenant the user may belong.

In accordance with an embodiment, the system enables isolation of the administration and runtime of different tenants from each other. For example, tenants can configure some behaviors of their applications, and resources to which they have access. The system can ensure that a particular tenant cannot administer artifacts belonging to another tenant; and, at runtime, that the applications working on behalf of a particular tenant refer only to resources associated with that tenant, and not to resources associated with other tenants.

In accordance with an embodiment, a tenant-unaware application is one that contains no logic dealing with tenants explicitly, such that any resources that the application uses may be accessible regardless of what user submitted a request to which the application is responding. In contrast, a tenant-aware application includes logic that explicitly deals with tenants. For example, based on a user's identity the application can derive the tenant to which the user belongs and use that information to access tenant-specific resources.

In accordance with an embodiment, the system enables users to deploy applications that are explicitly written to be tenant-aware, so that application developers can obtain the tenant ID of a current tenant. The tenant-aware application can then use the tenant ID to handle multiple tenants that are using a single instance of the application.

For example, the MedRec application, which supports a single doctor's office or hospital, can be exposed to two different partitions or tenants, e.g., a Bayland Urgent Care tenant, and a Valley Health tenant, each of which is able to access separate tenant-specific resources, such as separate PDBs, without changing the underlying application code.
Exemplary Domain Configuration and Multi-Tenant Environment In accordance with an embodiment, applications can be deployed to a resource group template at the domain level, or to a resource group that is scoped to a partition or scoped to the domain. Application configuration can be overridden using deployment plans specified per-application, or per-partition. Deployment plans can also be specified as part of a resource group.

Figure 4:
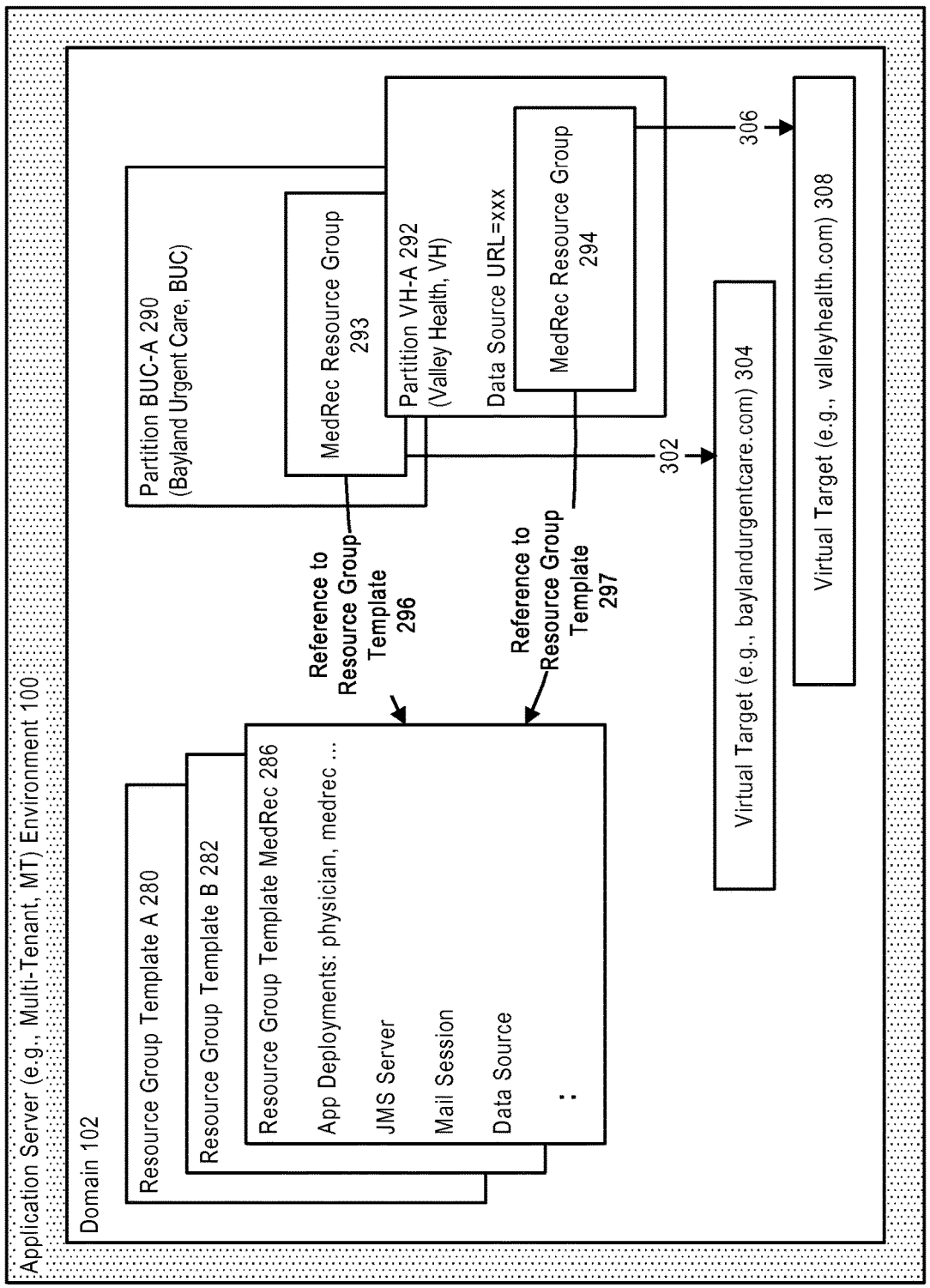
FIG. 4 illustrates a domain configuration for use with an exemplary multi-tenant environment, in accordance with an embodiment.

FIG. 4 illustrates a domain configuration for use with an exemplary multi-tenant environment, in accordance with an embodiment.

In accordance with an embodiment, when the system starts a partition, it creates virtual targets (e.g., virtual hosts) and connection pools, including one for each partition, to respective database instances, according to the provided configuration.

Typically, each resource group template can include one or more related applications and the resources on which those applications depend. Each partition can provide configuration data that is not specified in the resource group templates to which it refers, by providing a binding of the deployable resources in resource group templates to specific values associated with the partition; including, in some cases, overriding certain configuration information specified by the resource group template. This enables the system to activate an application represented by a resource group template differently for each partition, using the property values each partition has defined.

In some instances, a partition may contain resource groups that do not refer to resource group templates, or that directly define their own partition-scoped deployable resources. Applications and data sources that are defined within a partition are generally available only to that partition. Resources can be deployed so that they can be accessed from across partitions using partition:<partitionName>/<resource JNDI name>, or domain:<resource JNDI name>.

For example, a MedRec application can include a plurality of Java applications, a data source, a JMS server, and a mail session. To run the MedRec application for multiple tenants, the system administrator can define a single MedRec resource group template 286, declaring those deployable resources in the template.

In contrast to domain-level deployable resources, the deployable resources declared in a resource group template may not be fully configured in the template, or cannot be activated as-is, since they lack some configuration information.

For example, the MedRec resource group template may declare a data source used by the applications, but it may not specify a URL for connecting to the database. Partitions associated with different tenants, for example, partition BUC-A 290 (Bayland Urgent Care, BUC) and partition VH-A 292 (Valley Health, VH) can reference one or more resource group templates, by each including a MedRec resource group 293, 294 that references 296, 297 the MedRec resource group template. The reference can then be used to create 302, 306, the virtual targets/virtual hosts for each tenant, including a virtual host baylandurgentcare.com 304 associated with the BUC-A partition, for use by the Bayland Urgent Care tenant; and a virtual host valleyhealth.com 308 associated with the VH-A partition, for use by the Valley Health tenant.

Figure 5:
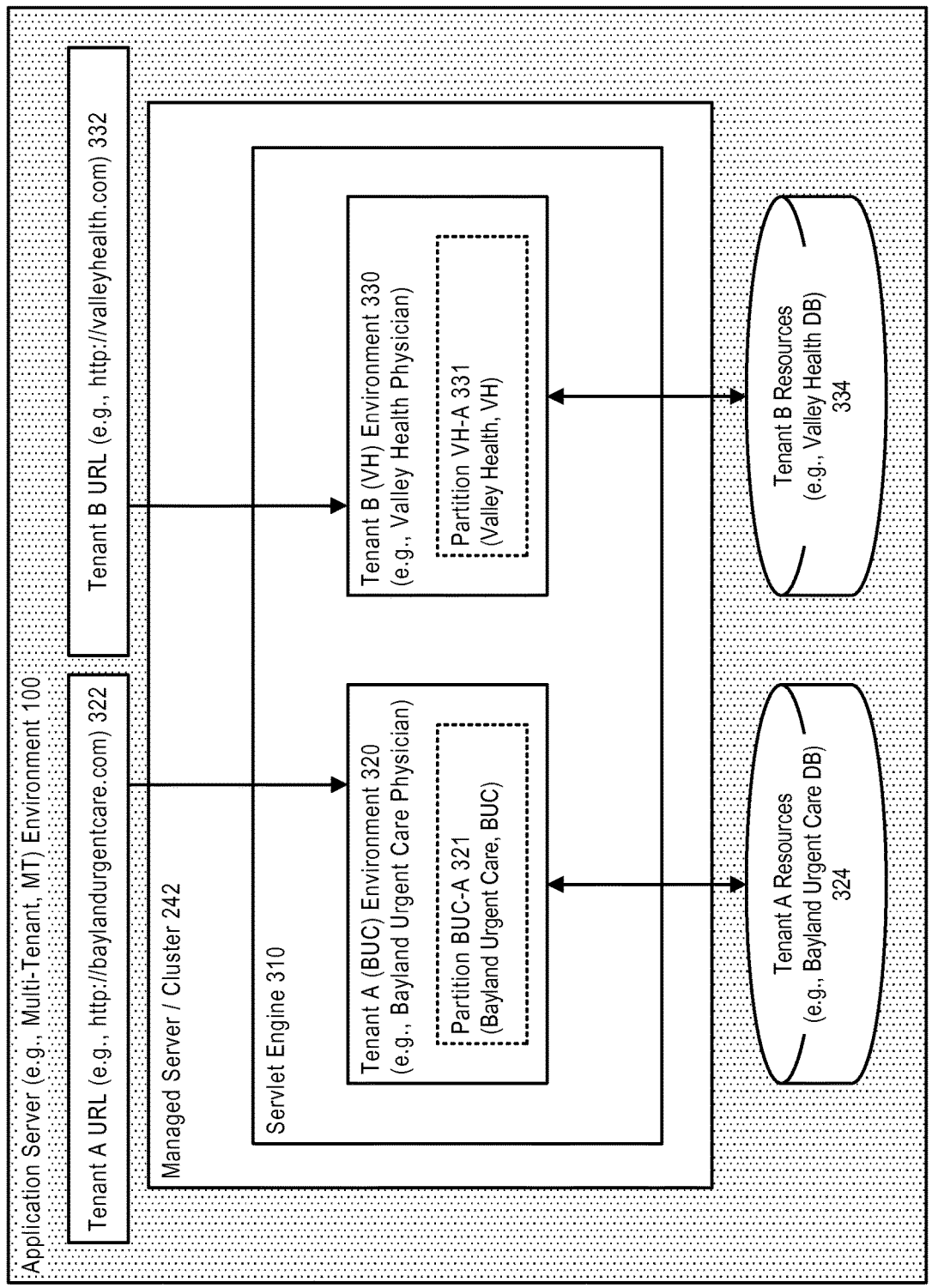
FIG. 5 further illustrates an exemplary multi-tenant environment, in accordance with an embodiment.

FIG. 5 further illustrates an exemplary multi-tenant environment, in accordance with an embodiment. As illustrated in FIG. 5, and continuing the example from above, in which two partitions reference the MedRec resource group template, in accordance with an embodiment, a servlet engine 310 can be used to support a plurality of tenant environments, in this example a Bayland Urgent Care Physician tenant environment 320, and a Valley Health Physician tenant environment 330.

In accordance with an embodiment, each partition 321, 331 can define a different virtual target on which to accept incoming traffic for that tenant environment, and a different URL 322, 332 for connecting to the partition and to its resources 324, 334, including in this example either a bayland urgent care database, or a valley health database respectively. The database instances can use compatible schemas, since the same application code will execute against both databases. When the system starts the partitions, it can create the virtual targets and connection pools to the respective database instances.
Support for Dynamic Clusters In accordance with an embodiment, a multi-tenant application server environment can contain a cluster of servers which can include a number of managed servers running simultaneously and working together. By providing a cluster of a number of managed servers, increased scalability as well as reliability can result. Additionally, by having such a cluster of multiple manager servers running within the MT application server environment, this can allow for increased performance, as partitions within the MT application server environment can call upon the server resources when needed. However, with the increase in computing power needed to run current applications, even with multiple managed servers running within a MT application server environment, latency and poor performance can still occur when there are insufficient managed servers for the partitions to use. Or, conversely, it may be that the MT application server environment is over-populated with running servers, thus leading to a waste of compute resources. When these, or other situations occur, it is desirable to allow an administrator to either scale up or scale down the number of managed servers running within the cluster within the MT application server environment.

In accordance with an embodiment, a dynamic cluster can be included within an MT application server environment. The dynamic cluster contains multiple managed servers that are based on a server template, instead of being created by individual server configuration. For example, a dynamic cluster can contain multiple managed servers that are based on a single server template. This server template can form the basis for all the servers in the dynamic cluster so that each server does not need to be manually configured when expanding the cluster. However, there are still certain aspects of a managed server than can be individually configured.

In an embodiment, dynamic clusters allow administrators of MT application server environments to easily scale up the number of server instances in a domain. For example, the administrator can specify, via a scripting tool, the number of managed servers to be active when a peak load is present. The system can then turn-on, or create if necessary, the required number of managed servers. Each managed server that is turned-on or created can have the appropriate server template applied to it. When additional server capacity is needed, a new managed server can be added (e.g., turned-on or created) to the dynamic cluster without having to first manually configure the new managed server. An administrator does not have to manually configure managed servers. This allows an administrator to dynamically scale the dynamic cluster.

Scale Up

Figure 6:
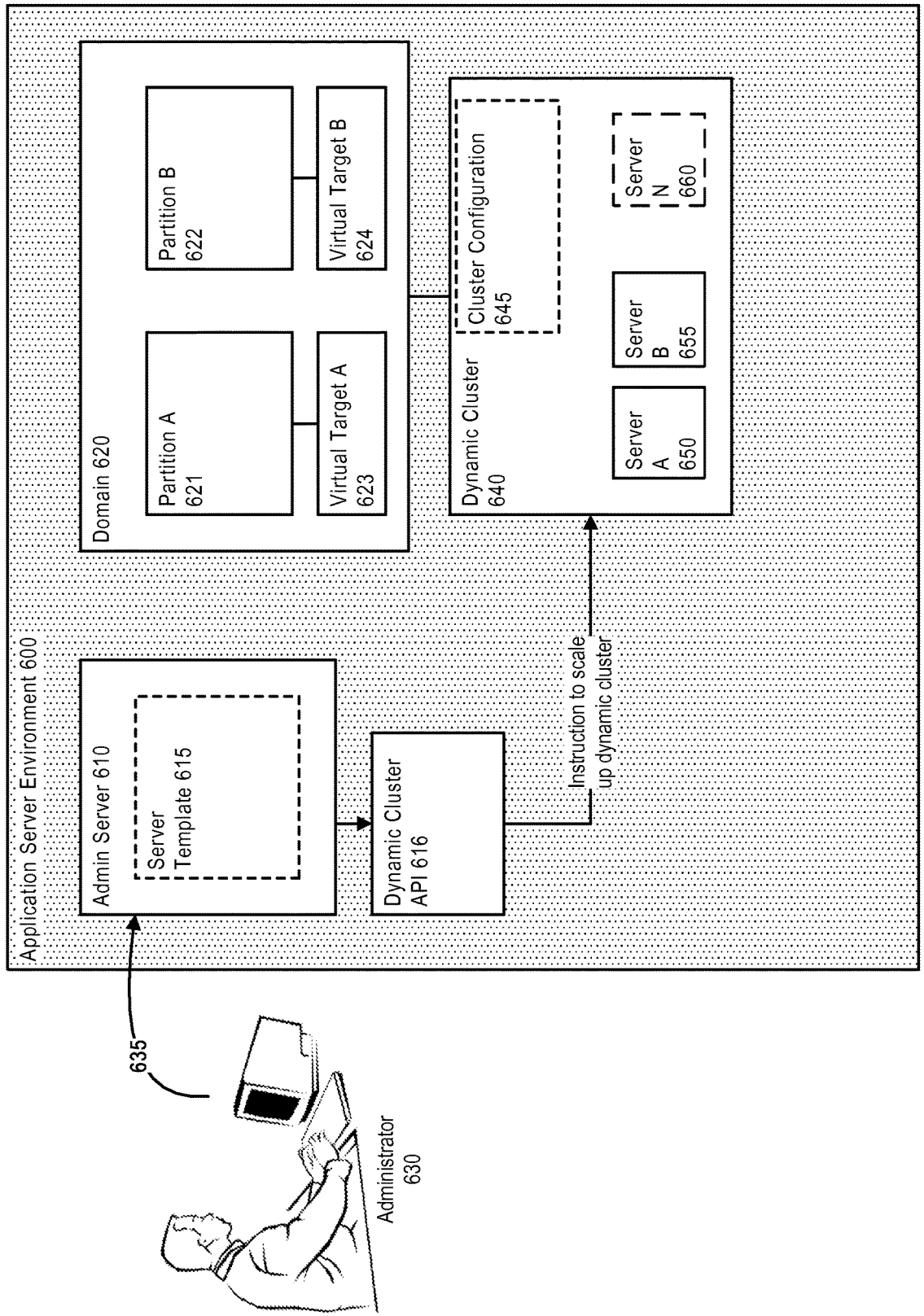
FIG. 6 illustrates a system for supporting configuration of dynamic clusters in a multitenant application server environment, in accordance with an embodiment.

FIG. 6 illustrates a system for supporting configuration of dynamic clusters in a multitenant application server environment, in accordance with an embodiment. The system of FIG. 6 shows an application server environment 600, which includes an administration server 610, a dynamic cluster API 616, domain 620, and dynamic cluster 640. In turn the administrative server 610 includes a server template. The domain 620 includes partitions A and B, 621 and 622 respectively, and virtual targets A and B, 623 and 624 respectively. The dynamic cluster 640 includes a cluster configuration 645, as well as running managed servers A, B, 650 and 655 respectively, and non-running server N 660. The system shown in FIG. 6 also shows an administrator 630, as well as a communication path 635 between the administrator 630 and the administrative server 610.

In accordance with an embodiment, the cluster configuration 645 sets several configuration settings for the dynamic cluster 640. For example, the cluster configuration 645 sets the maximum number of managed servers running, or capable of being run, within the dynamic cluster at any given time.

In accordance with an embodiment, the server template 615, which is accessed by the administration server 610, can provide a user (such as an administrator) with an easy to use template which is used to create servers within a dynamic cluster. The server template 615 can specify which machine a newly created server is mapped to. The server template can also be used to provide an identification (ID) to a newly created server. In addition, the server template 615 can also be used to specify a localhost for a newly created server. Additionally, the server template 615 can be used to specify a listen address (e.g., a hostname or an IP address) for a newly created server via a macro, such as myserver${id}.com, or 10.28.5.${id}. The server template can also allow for mapping to additional IP addresses, including IP addresses for ListenAddress, ExternalDN-SName, InterfaceAddress, MessageBusAddress, and addresses contained within a NetworkAccess Points configuration.

In an embodiment of the present disclosure, the API 616 is embodied within an Oracle™ WebLogic Server. The dynamic cluster API 616 can be an API associated with a runtime MBean. Additionally, the dynamic cluster API, for example, can be a WebLogic Scripting Tool (WLST) API.

In an embodiment of the present disclosure, the administrator 630 establishes a connection with the administration server 610 via a communication path 635, which can include various communication and scripting tools, such as WLST. Once the connection has been established with the administration server 610, the administrator can pass a command to scale up the dynamic cluster. The administrator can pass this command through, for example, a WebLogic Scripting Tool. As described above, the command to scale up a dynamic server can occur, for example, when an administrator notices that the system resources are insufficient for the current load on the running servers within the dynamic cluster.

In an embodiment, the scale up command will increase, via the dynamic cluster API 616 passing the instruction to scale up the dynamic cluster, the number of servers for a specified dynamic cluster by the number of servers specified in the command. In the event that the number of servers specified in the command will increase the number of servers above a maximum set in the cluster configuration, an edit session can be created (i.e., by changing the value of updateConfiguration in the below command from false to true), and the maximum size of the cluster can be increased by the necessary value and the changes activated. The specified number of new servers will be started. The non-running server with the lowest server id can be started first, followed by the next highest non-running server id. See the following for an example of a WLST command for scale up:

```
scaleUp(clusterName,numServers=1,
    updateConfiguration=false,block=true,timeout-
    Seconds=600,type="DynamicCluster")
```

In an embodiment, the optional block argument in the above command can specify whether WLST should block user interaction until a server is started. Block is set to false for the method to return without waiting for verification that the server(s) have started. The timeout for scaling up command can default to 600 seconds, which can be set using the timeoutSeconds argument.

In an embodiment, once a command to scale up the dynamic cluster 640 has been passed to the administration server 610, the administration server then passes the command through the dynamic cluster API 616. From there, the scale up command, which includes a command to increase, by a specified, non-zero amount, the number of managed servers running within the dynamic cluster 640, either starts or creates the specified number of managed servers within the dynamic cluster 640. What is included in the command to scale up the dynamic cluster can be dependent upon the cluster configuration 645.

In an embodiment, whether a dynamic cluster starts or creates the requested additional managed servers is dependent upon whether there are enough non-running servers to satisfy the scale up command. If a scale up command is received that requests a number of servers be started within the dynamic cluster, and the requested number is less than or equal to the number of non-running servers in the dynamic cluster before the scale up request was received, then the dynamic cluster starts the requested number of servers. In a situation where there are an inadequate number of non-running servers to accommodate the scale up request, then the dynamic cluster will create, using the server template, the necessary number of servers to satisfy the scale up command.

In an embodiment, a scale up command is received that requests a dynamic cluster increase the number of running, managed servers (e.g., increasing from currently running managed servers A and B, 650 and 655, to start server N 660 running) by a specified number of servers such that the total number of servers running within the dynamic cluster 640, after the scale up command has been performed, is less than or equal to the maximum number of managed servers for the dynamic cluster as set by the cluster configuration 645. In such a situation, where the total number of managed servers running after the scale up command has been performed is less than or equal to the maximum set by the cluster configuration 645, then the requested number of managed servers within the dynamic cluster are started/created using the server template 615 as a basis for starting/creating the additional managed servers.

For example, in an embodiment, a dynamic cluster is currently operating with five managed servers running, with a maximum of 10 managed servers running being set by the cluster configuration. An administrator, upon seeing an increased load and/or peak traffic, requests, via the WebLogic Scripting Tool, that four additional managed servers be created in order to alleviate the problems associated with the peak load. Because the addition four managed servers do not push the dynamic cluster above the threshold (e.g., the maximum number of managed servers as set by the cluster configuration), then the requested four additional managed servers are automatically created, using the server template.

Alternatively, in an embodiment, a scale up command is requested that requests a dynamic cluster increase the number of running, managed servers (e.g., increasing from currently running managed servers A and B, 650 and 655, to start server N 660 running) by a number of servers such that the total number of servers running within the dynamic cluster 640, after the scale up command has been performed, is greater than to the maximum number of managed servers for the dynamic cluster as set by the cluster configuration 645.

For example, in an embodiment, if the dynamic cluster of FIG. 6 had a maximum size set, by the cluster configuration 645, at 2 managed servers, and the command was received to start server N 660. In such a situation, where the total number of managed servers running after the scale up command has been performed is greater than maximum set by the cluster configuration 645, then, in addition to starting/creating the requested number of managed servers within the dynamic cluster, using the server template 615 as a basis for starting/creating the additional managed servers, an edit session will be created, and the maximum size of the dynamic cluster will be increased within the cluster configuration 645 by the required amount to accommodate the requested increase in size of the dynamic cluster. The current example, the maximum number of servers set by the cluster configuration 645 would be increased by 1, in order to accommodate 3 manager servers running.

For example, in an embodiment, a dynamic cluster may be currently operating with five managed servers running, with a maximum of 10 managed servers running being set by the cluster configuration. An administrator, upon seeing an increased load and/or peak traffic, requests, via the WebLogic Scripting Tool, that 7 additional managed servers be created in order to alleviate the problems associated with the peak load. Because the additional 7 managed servers push the dynamic cluster above the threshold (e.g., the maximum number of managed servers as set by the cluster configuration), then an edit session is automatically opened in order to change the maximum number of managed servers within the dynamic cluster to 12, and the requested 7 additional managed servers are automatically created, using the server template.

In accordance with an embodiment, the application server environment 700 can comprise a multitenant application server (MT) environment.

Scale Down

Figure 7:
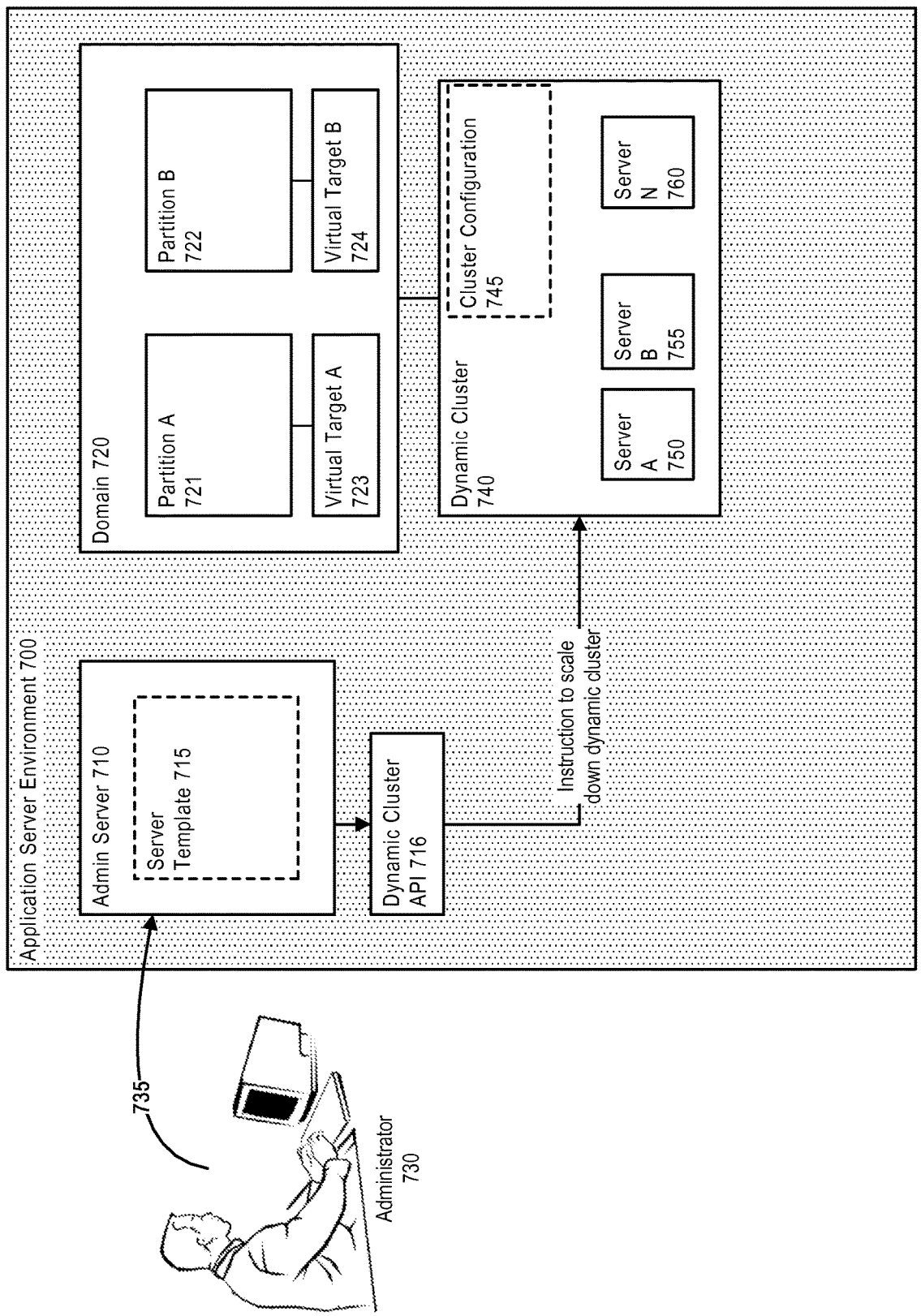
FIG. 7 illustrates a system for supporting configuration of dynamic clusters in a multitenant application server environment, in accordance with an embodiment.

FIG. 7 illustrates a system for supporting configuration of dynamic clusters in a application server environment, in accordance with an embodiment. The system of FIG. 7 shows an application server environment 700, which includes an administration server 710, a dynamic cluster API 716, domain 720, and dynamic cluster 740. In turn the administrative server 710 includes a server template. The domain 720 includes partitions A and B, 721 and 722 respectively, and virtual targets A and B, 723 and 724 respectively. The dynamic cluster 740 includes a cluster configuration 745, as well as running managed servers A, B, and N 750, 755, and 760 respectively. The system shown in FIG. 7 also shows an administrator 730, as well as a communication path 735 between the administrator 730 and the administrative server 710.

In an embodiment of the present disclosure, the administrator 730 establishes a connection with the administration server 710 via a communication path 735, which can include various communication and scripting tools, such as the WebLogic Scripting Tool (WLST). Once the connection has been established with the administration server 710, the administrator can pass a command to scale down the dynamic cluster. The administrator can pass this command through, for example, a WebLogic Scripting Tool. The command to scale down a dynamic server can occur, for example, when an administrator notices that there are more than sufficient system resources for the current load on the running servers within the dynamic cluster.

In an embodiment, the scale down command will decrease the number of servers within a dynamic cluster by a specified number of servers specified in the command. An administrator may optionally create an edit session to decrease the maximum size of the dynamic cluster. The specified number of new servers will be stopped. The running server with the highest server id can be shutdown first, followed by the next highest server id. Here is an example of a WLST command for scale down:

```
scaleDown(clusterName,numServers=1,
    updateConfiguration=false,block=true,timeout-
    Seconds=100,type="DynamicCluster")
```

In an embodiment, the optional block argument in the above command can specify whether WLST should block user interaction until a server is shut down. Block is set to false for the method to return without waiting for verification that the server(s) have been shut down. The timeout for scaling down command can default to 100 seconds, which can be set using the timeoutSeconds argument.

In an embodiment, once a command to scale down the dynamic cluster 740 has been passed to the administration server 710, the administration server then passes the command through the dynamic cluster API 716. From there, the scale down command, which includes a command to decrease, by a specified, non-zero amount, the number of managed servers running within the dynamic cluster 740, shuts down the specified number of managed servers within the dynamic cluster 740. For example, referring to FIG. 7, dynamic cluster 740 initially has 3 managed servers running, namely servers A, B, and N, 750, 755, and 760 respectively. If a command to scale down the dynamic cluster by 1 managed server is received, then managed server N is shut down. An administrator, as discussed above, may optionally start an edit session to decrease the maximum size of the dynamic cluster as set within the cluster configuration (i.e., by changing the value of updateConfiguration from false to true).

For example, in an embodiment, a dynamic cluster is currently operating with eleven managed servers running, a maximum number of 11 managed servers running being set by the cluster configuration. An administrator, upon seeing an inefficient use of compute resources, requests, via the WebLogic Scripting Tool, that three managed servers be stopped/shut down, leaving 8 managed servers running. The administrator can optionally open an edit session to decrease the maximum number of 11 managed servers, as set within the cluster configuration, to 8, or optionally to 9 or 10 if desired.

In an embodiment, where a scale down request from a system administrator requests that the dynamic cluster reduce more managed servers than are currently running, for example a scale down request asking that 6 servers be shut down when there are only 5 servers currently running, an error message can be raised and logged, and no action will be performed.

In accordance with an embodiment, the application server environment 700 can comprise a multitenant application server (MT) environment.

WLST APIs for Dynamic Clusters

In accordance with an embodiment, WLST APIs are used for dynamic cluster lifecycle operations. These operations include, but are not limited to: starting one non-running server, starting one non-running server when a maximum number of servers, as set by the cluster configuration, has already been reached, starting all non-running servers, start n non-running servers (where n is a non-zero integer), starting n non-running servers when a maximum number of servers, as set by the cluster configuration, has already been reached by adding the minimum required number of servers to satisfy the command, gracefully shutdown n servers, and gracefully shut down n servers and remove a number of servers from the configuration (e.g., shrink the configuration).

In an embodiment, a WebLogic Server can add WLST commands to allow a customer/administrator to more easily manage a dynamic cluster. This can include starting and stopping servers in a dynamic cluster and expanding or shrinking the size of the dynamic cluster.

Supporting Configuration of Dynamic Clusters

Figure 8:
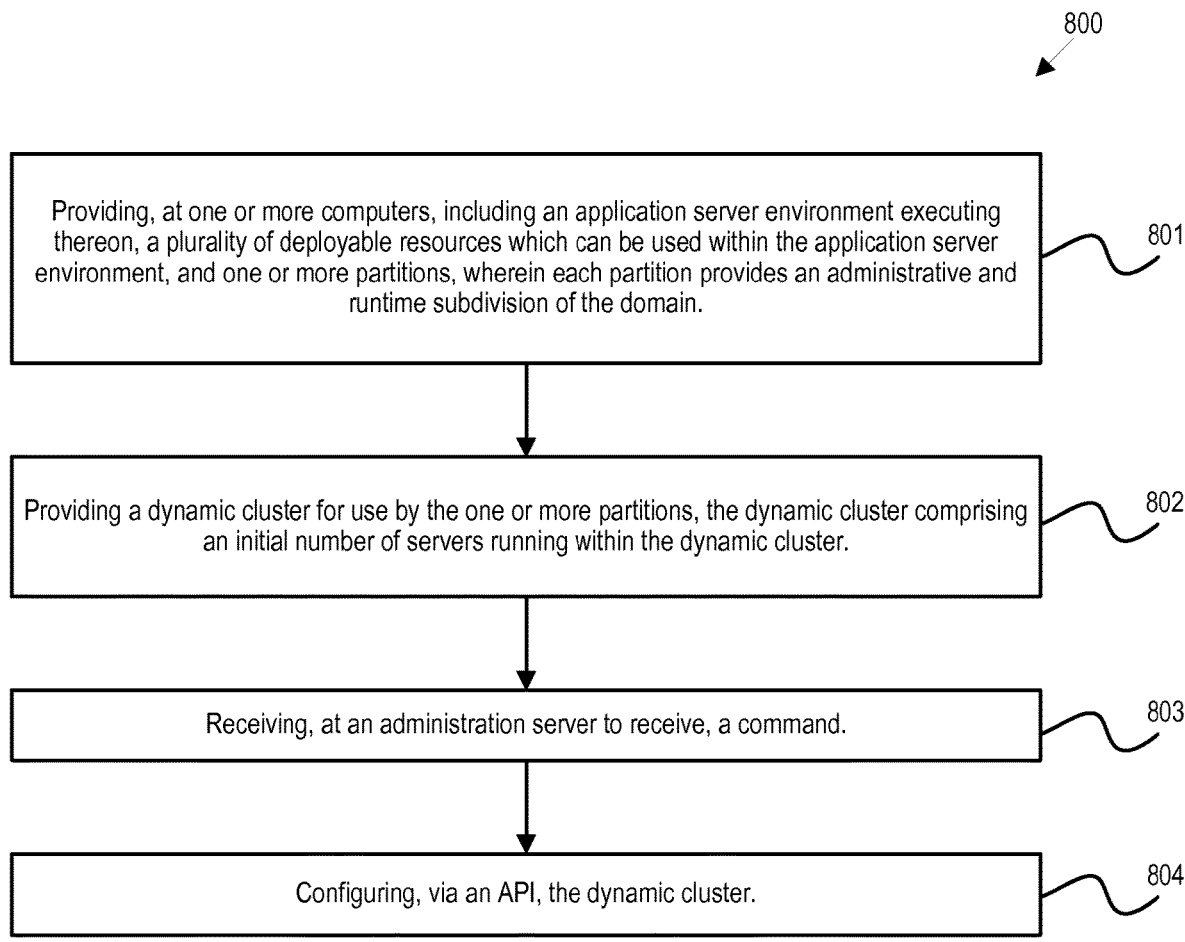
FIG. 8 is a flow chart illustrating a method for supporting configuration of dynamic clusters in a multitenant application server environment, in accordance with an embodiment.

FIG. 8 is a flow chart illustrating a method 800 for supporting configuration of dynamic clusters in an application server environment, in accordance with an embodiment. In accordance with the depicted embodiment, the method 800 begins at step 801 with providing, at one or more computers, including an application server environment executing thereon, a plurality of deployable resources which can be used within the application server environment, and one or more partitions, wherein each partition provides an administrative and runtime subdivision of the domain. The method 800 can continue at step 802 with providing a dynamic cluster for use by the one or more partitions, the dynamic cluster comprising an initial number of servers running within the dynamic cluster. The method 800 can proceed at step 803 with receiving, at an administration server, a command. Finally, the method 800 can conclude at step 805 with configuring, via an API, the dynamic cluster.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for supporting configuration of dynamic clusters in an application server environment, comprising:

one or more computers, including an application server that enables deployment and execution of software applications, wherein the application server is associated with a domain configuration that is used at runtime to define a domain for execution of the software applications, together with a plurality of partitions, wherein each of the plurality of partitions is associated with a partition configuration, and wherein each partition provides a subdivision of the domain-and includes one or more resource groups for use within the partition target, and wherein each resource group comprises a collection of deployable applications or resources defined at a partition level;

an administration server, the administration server comprising a server template, the server template comprising configuration settings that configure created servers;

a dynamic cluster for use by the plurality of partitions and each resource group, the dynamic cluster comprising a first number of running managed servers, each running server assigned to a machine of a machine of a plurality of machines, wherein each machine is assigned a weight indicative of an available load on each machine;

a cluster configuration at the dynamic cluster, wherein the cluster configuration sets a maximum number of managed servers for the dynamic cluster; and an application programming interface (API) used to configure the dynamic cluster via a runtime configuration object;

wherein the administration server receives a command to scale up the dynamic cluster including an instruction to start a first specified number of managed servers; and wherein the dynamic cluster, upon receipt of the command to scale up the dynamic cluster from the administration server:

determines that an aggregate of the first specified number of managed servers and the first number of running managed servers exceeds the maximum number of managed servers specified by the cluster configuration, creates an edit session and increases, via the edit session, the maximum number of managed servers specified by the cluster configuration, starts/creates the first specified number of managed servers using the server template to configure each started and created managed server, and assigns each started and created managed server to a machine of the plurality of machines based at least upon the assigned weight of each machine.

2. The system of claim 1, wherein the API is a scripting tool API.

3. The system of claim 1, wherein the server template specifies a localhost for each newly created server.

4. The system of claim 1, wherein the server template specifies the unique identifier.

5. The system of claim 1, wherein the server template specifies a listen address for each newly created server.

6. The system of claim 5, wherein the listen address is one of a host name or an Internet Protocol (IP) address.

7. The system of claim 5, wherein the server template specifies the listen address via a macro.

8. The system of claim 2, wherein the command includes a block argument that specifies that the scripting tool API blocks user interaction on a starting server until the starting server is started.

9. The system of claim 1, wherein the application server environment comprises a multi-tenant application server environment, and wherein the system can associate the partition of the plurality of partitions with a tenant, for use by the tenant.

10. A method for supporting configuration of dynamic clusters in an application server environment, comprising:
providing, at one or more computers, including an application server that enables deployment and execution of software applications, wherein the application server is associated with a domain configuration that is used at runtime to define a domain for execution of the software applications, together with a plurality of partitions wherein each of the plurality of partitions is associated with a partition configuration, and wherein each partition provides a subdivision of the domain-and includes one or more resource groups for use within the partition target, and
wherein each resource group comprises a collection of deployable applications or resources defined at a partition level;
providing an administration server, the administration server comprising a server template, the server template comprising configuration settings that configure created servers;
providing a dynamic cluster for use by the plurality of partitions and each resource group, the dynamic cluster comprising a first number of running managed servers, each running server assigned to a machine of a machine of a plurality of machines, wherein each machine is assigned a weight indicative of an available load on each machine;
providing a cluster configuration at the dynamic cluster, wherein the cluster configuration sets a maximum number of managed servers for the dynamic cluster;
configuring, via an application programming interface (API) via a runtime configuration object, the dynamic cluster;
receiving, at the administration server, a command to scale up the dynamic including an instruction to start a first specified number of managed servers; and
upon receipt of the command to scale up the dynamic cluster from the administration server:
determining, by the dynamic cluster, an aggregate of the first specified number of managed servers and the first number of running managed servers exceeds the maximum number of managed servers specified by the cluster configuration,
creating, by the dynamic cluster, an edit session and increasing, via the edit session, the maximum number of managed servers specified by the cluster,
starting/creating, by the dynamic cluster, the first specified number of managed servers using the server template to configure each started and created managed server, and
assigning each started and created managed server to a machine of the plurality of machines based at least upon the assigned weight of each machine.

11. The method of claim 10, wherein the server template specifies a localhost for each newly created server.

12. The method of claim 10, wherein the server template specifies the unique identifier.

13. The method of claim 10, wherein the server template specifies a listen address for each newly created server.

14. The method of claim 13, wherein the listen address is one of a host name or an Internet Protocol (IP) address.

15. The method of claim 13, wherein the server template specifies the listen address via a macro.

16. The method of claim 10, wherein the application server environment comprises a multi-tenant application server environment, and wherein the system can associate the partition of the plurality of partitions with a tenant, for use by the tenant.

17. The method of claim 10, wherein the API is a scripting tool API.

18. The method of claim 17, wherein the command includes a block argument that specifies that the scripting tool API blocks user interaction on a starting server until the starting server is started.

19. A non-transitory computer readable storage medium, including instructions stored thereon which when read and executed by one or more computers cause the one or more computers to perform the steps comprising:
providing, at one or more computers, including an application server that enables deployment and execution of software applications, wherein the application server is associated with a domain configuration that is used at runtime to define a domain for execution of the software applications, together with a plurality of partitions wherein each of the plurality of partitions is associated with a partition configuration, and wherein each partition provides a subdivision of the domain-and includes one or more resource groups for use within the partition target, and
wherein each resource group comprises a collection of deployable applications or resources defined at a partition level;
providing an administration server, the administration server comprising a server template, the server template comprising configuration settings that configure created servers;
providing a dynamic cluster for use by the plurality of partitions and each resource group, the dynamic cluster comprising a first number of running managed servers, each running server assigned to a machine of a machine of a plurality of machines, wherein each machine is assigned a weight indicative of an available load on each machine;
providing a cluster configuration at the dynamic cluster, wherein the cluster configuration sets a maximum number of managed servers for the dynamic cluster;

configuring, via an application programming interface (API) via a runtime configuration object, the dynamic cluster;

receiving, at the administration server, a command to scale up the dynamic including an instruction to start a first specified number of managed servers; and upon receipt of the command to scale up the dynamic cluster from the administration server:
- determining, by the dynamic cluster, an aggregate of the first specified number of managed servers and the first number of running managed servers exceeds the maximum number of managed servers specified by the cluster configuration,
- creating, by the dynamic cluster, an edit session and increasing, via the edit session, the maximum number of managed servers specified by the cluster,
- starting/creating, by the dynamic cluster, the first specified number of managed servers using the server template to configure each started and created managed server, and
- assigning each started and created managed server to a machine of the plurality of machines based at least upon the assigned weight of each machine.

20. The non-transitory computer readable storage medium of claim 19, wherein the API is a scripting tool API.

* * * * *